United States Patent [19]

Dugan et al.

[11] Patent Number: 4,496,159

[45] Date of Patent: Jan. 29, 1985

[54] AERIAL GUNNERY TARGET DEPLOYMENT SYSTEM

[76] Inventors: Elmo A. Dugan, 8639 Hatillo Ave.; Louis G. Kish, 8542 Lurline Ave., both of Canoga Park, Calif. 91306; Edwin J. Miller, 30473 Mulholland Hwy., Space 18, Agoura, Calif. 91301; George J. Fabian, 6640 Darby Ave., No. 11, Reseda, Calif. 91335

[21] Appl. No.: 497,570

[22] Filed: May 24, 1983

[51] Int. Cl.³ ............................................. B64D 3/02
[52] U.S. Cl. .................................... 273/341; 89/1.54; 244/3
[58] Field of Search .............. 273/360, 361; 89/1.5 R, 89/1.5 C, 1.5 G, 1.5 H; 244/3, 137 A

[56] References Cited

U.S. PATENT DOCUMENTS

| | | | |
|---|---|---|---|
| 1,890,142 | 12/1932 | Bollam | 89/1.5 C |
| 2,585,030 | 2/1952 | Nosker | 89/1.5 C X |
| 2,921,501 | 1/1960 | Parot | 89/1.5 R |
| 2,923,278 | 2/1960 | Katzberg | 89/1.5 R X |
| 2,958,260 | 11/1960 | Anderson | 89/1.5 R X |
| 3,008,376 | 11/1961 | Brunow et al. | 89/1.5 C |
| 3,273,459 | 9/1966 | Lardin | 89/1.5 C |
| 4,343,447 | 8/1982 | Reed | 89/1.5 G X |

FOREIGN PATENT DOCUMENTS

| | | | |
|---|---|---|---|
| 1394534 | 2/1965 | France | 273/361 |
| 993992 | 6/1965 | United Kingdom | 273/361 |

Primary Examiner—Paul E. Shapiro
Attorney, Agent, or Firm—John J. Posta, Jr.

[57] ABSTRACT

An improved aerial gunnery target and reel system is provided which includes an aerial target, a housing affixable to an airframe, a cable spool secured for rotation in the housing, with cable wound therearound and connected to the target, a reel powering and control mechanism in the housing and a target launcher assembly in the housing. The launcher assembly includes a launcher arm extending from the housing, releasably secured to the target and movable with the target between a compact, protected target stored position and a target launch position where the target is exposed to the air slipstream during operation of an aircraft to which the system is connected. The arm rotates or telescopes between the two positions. The launcher assembly also includes a powering mechanism such as a pneumatic or hydraulic ram or an electric motor which moves the arm and attached target between the two positions. Such powering mechanism also operates a locking device to lock the arm to and unlock it from the target. The system is compact, simple, durable, inexpensive and efficient. It can be used on both large and small aircraft without interference with the aircraft.

6 Claims, 6 Drawing Figures

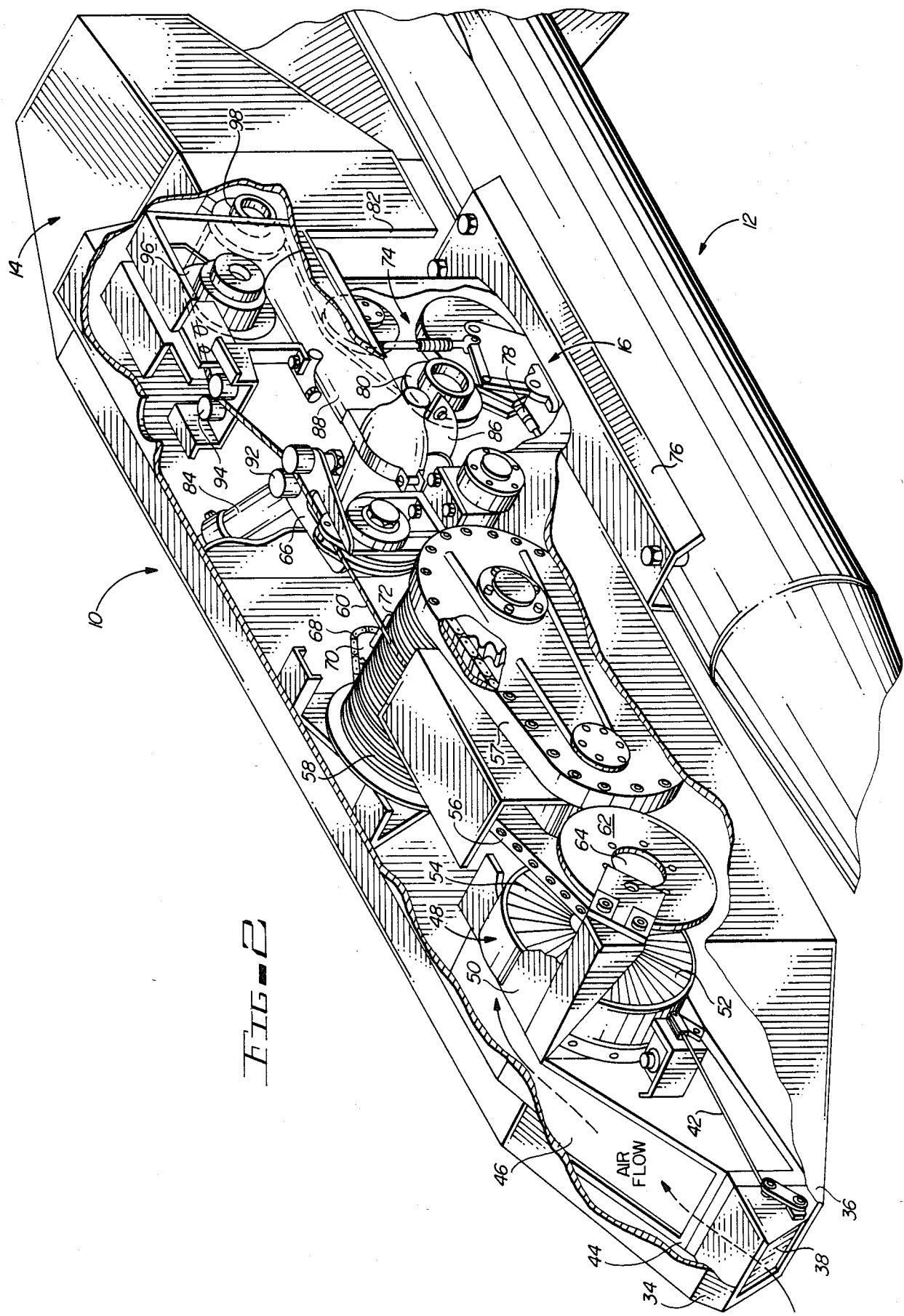

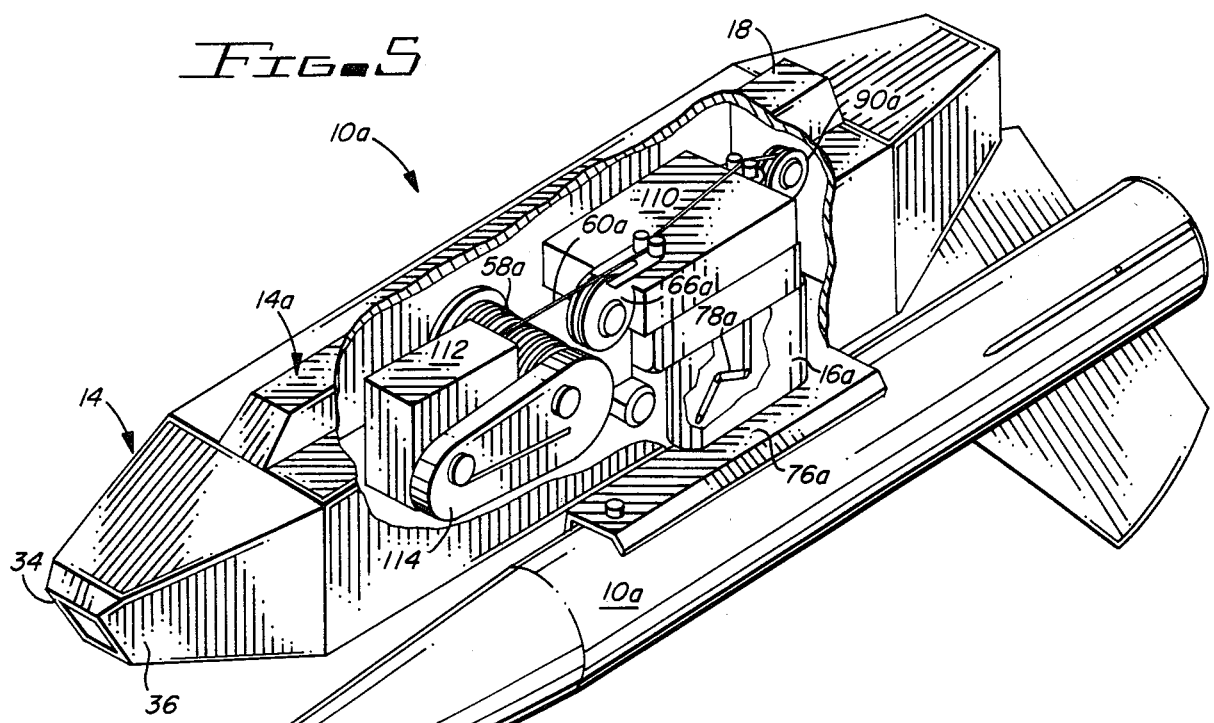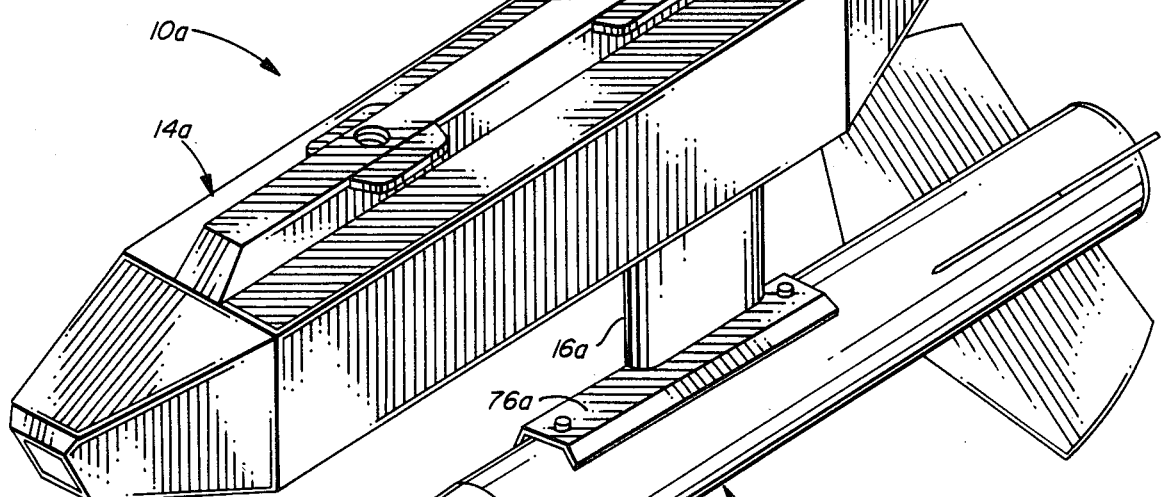

AERIAL GUNNERY TARGET DEPLOYMENT SYSTEM

BACKGROUND OF THE INVENTION

1. Field of the Invention

The present invention generally relates to target launching and recovery means and more particularly to an improved aerial gunnery target and reel system.

2. Prior Art

Currently, most aerial gunnery targets and twolines are air-dropped after each mission, with an attendent high loss rate. Although these visual targets are suitable to exercise weapon usage and procedures, they fall short in the evaluation of pilot and weapon systems performance. Even direct hits are undetected in the newer targets. In order to evaluate effectiveness, an expensive electronic miss-distance indicator must be used at the target. It therefore becomes very desirable to be able to recover this indicator intact along with the target and twoline.

Certain aerial target recovery systems have been devised and are in use. Some of these systems are bulky and not well adapted for use on small light weight aircraft. Others of these system are relatively expensive. There is still a need for a low cost, low weight, compact, durable and efficient aerial target gunnery deployment and recovery system which can be easily connected to the underside of the main fuselage and/or wing of even small aircraft and can be utilized to efficiently pay out and retrieve aerial targets.

SUMMARY OF THE INVENTION

The improved aerial gunnery target and two reel system of the present invention satisfies all the foregoing needs. The system is light in weight, low in cost, durable and efficient. The system is substantially as set forth in the Abstract above. Thus, it includes an aerial target and a housing connectable to an airframe and containing a cable spool rotatably secured therein with cable wound around and connected to the target, a reel powering and control mechanism and a target launcher assembly. The launcher assembly has a launcher arm powered pneumatically, electrically or the like so that it moves, i.e, it rotates or telescopes with the target attached thereto between a target stored position and a target launch position. When the arm and target are in the stored position, they are out of the aircraft's slipstream and present no ground clearance problem. Moreover, they do not interfere with the aircraft's flight performance or operation of its flaps, wheels, etc. When the arm and target are in the launch position, the target is in the aircraft's slipstream, i.e., is exposed to the rush of air past the craft and is easily deployable once it is detached from the arm. Further features of the invention are set forth in the following detailed description and accompanying drawings.

BRIEF DESCRIPTION OF THE DRAWINGS

FIG. 2 is a schematic perspective view, partly broken away, of the system of FIG. 1, with certain internal components thereof shown therein.

FIG. 5 is a schematic perspective view, partly broken away, of a second preferred embodiment of the improved aerial gunnery target and tow reel system of the present invention shown in the stored target position.

FIG. 6 is a schematic perspective view of the system of FIG. 5 shown in the target launch position.

DETAILED DESCRIPTION OF THE PREFERRED EMBODIMENT

FIGS. 1-4

Figure 1:
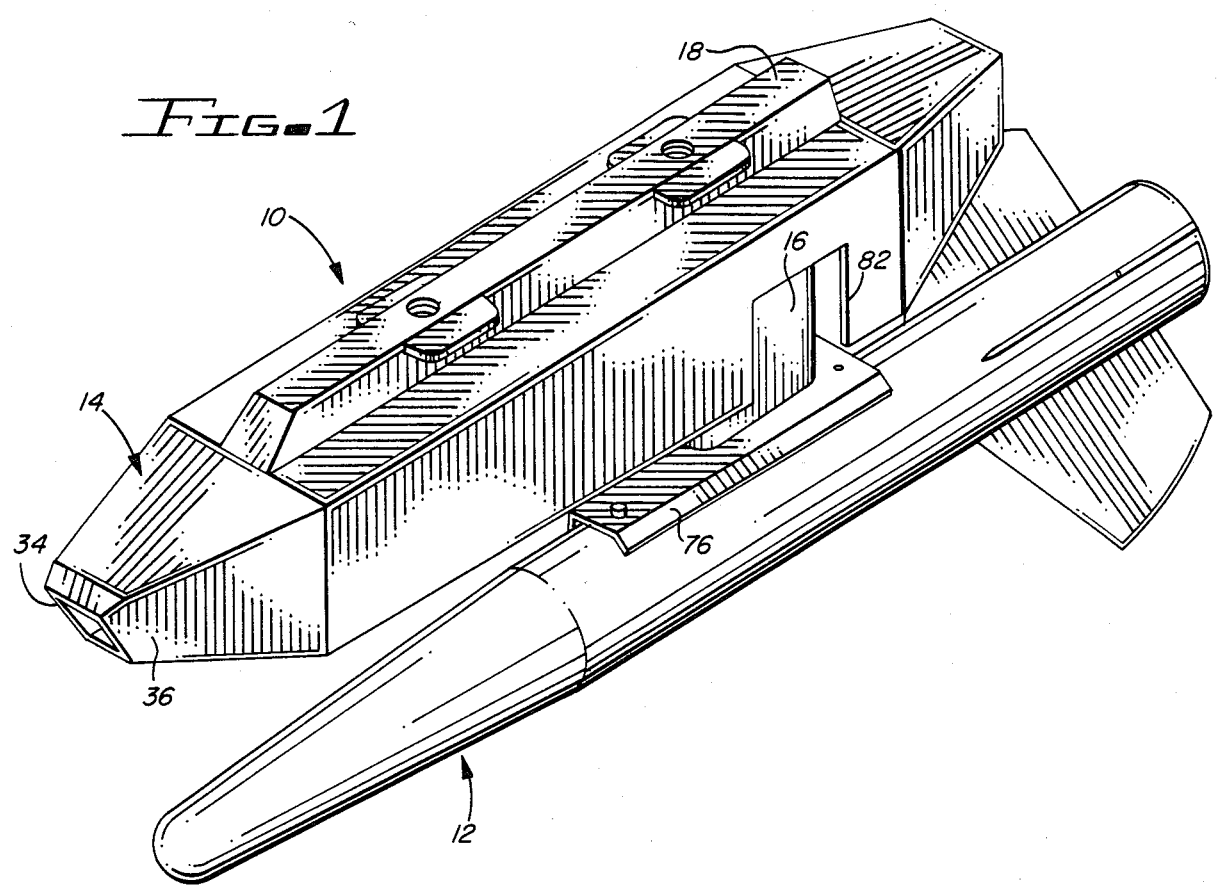
FIG. 1 is a schematic perspective view of a first preferred embodiment of the improved aerial gunnery target and tow reel system of the present invention.
Figure 3:
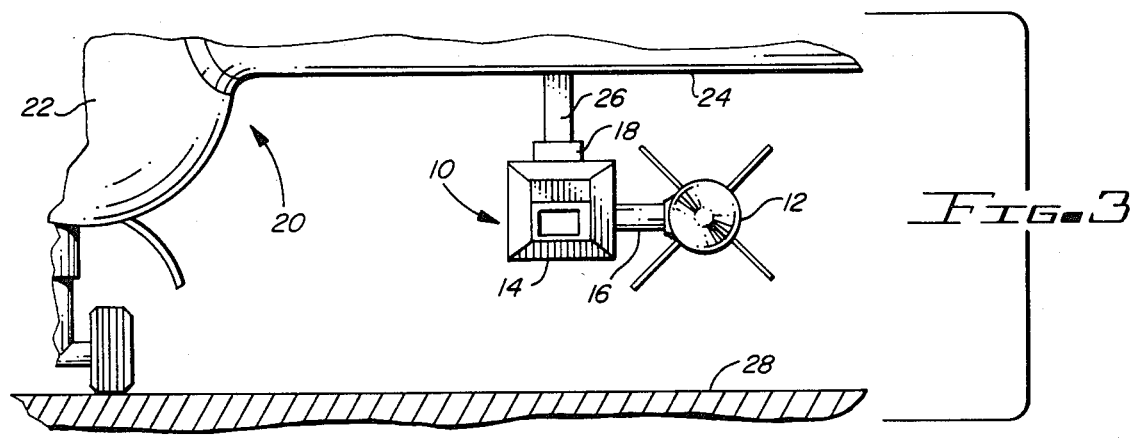
FIG. 3 is a schematic fragmentary front elevation of the system of FIG. 1 installed under the main body of an aircraft.
Figure 4:
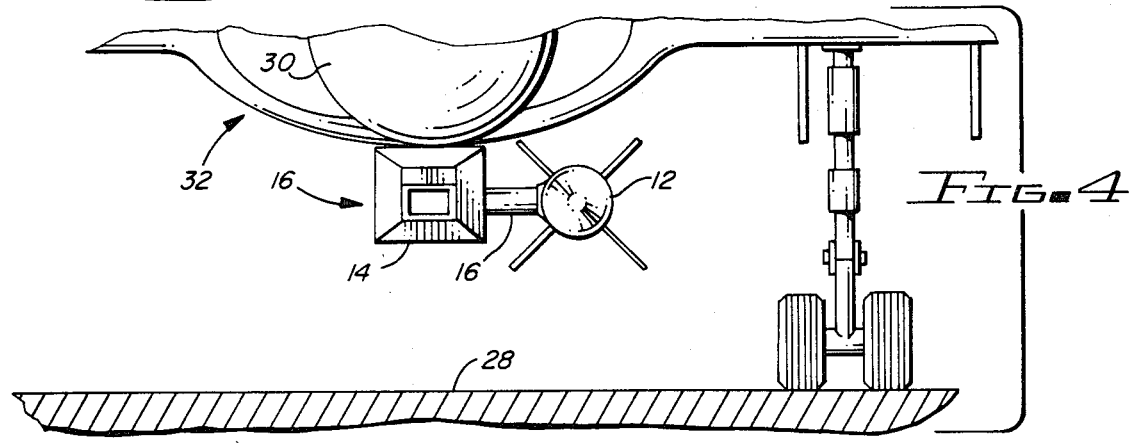
FIG. 4 is a schematic fragmentary front elevation of the system of FIG. 1 installed under the wing of another aircraft.

Now referring more particularly to FIGS. 1-4 of the accompanying drawings, a preferred embodiment of the improved system of the present invention is schematically depicted therein. Thus, FIG. 1 shows that system 10 includes a torpedo shaped finned target 12 secured to and depending from a low profile generally rectangular elongated housing 14 by an arm 16, so that target 12 is ready to be deployed. Housing 14 is adapted to be connected by a bracket 18 to the underside of an aircraft fuselage such as is shown in FIGS. 3 and 4. Thus, in FIG. 3, airplane 20 is shown, having a main body 22 and wing 24. System 10 is shown depending from wing 24 by a strut 26 connected to bracket 18. It will be noted that arm 16 is holding target 12 to the side of housing 14 so that needed clearance from the ground 28 is obtained for system 10 and so that system 10 does not interfere with the wheels or air performance of plane 20. This is the retracted or stored position for system 10, in contrast to the operational position shown in FIG. 1.

In FIG. 4, system 10 is shown mounted by bracket 18 directly to the underside of the main fuselage 30 of an aircraft 32. In FIG. 4, system 10 is in the retracted position with target 12 held to the side of housing 14, by arm 16 as in FIG. 3, to clear ground 28.

Housing 14 contains components arranged for launching target 12 and for reeling it in and holding it in place. Referring more particularly to FIG. 2, an improved compact reeling mechanism is shown therein. Thus, housing 12 is shown to include an air inlet cowling 34 at the front end 36 thereof. The inlet may be, for example, 5.25 inch×5.25 inch in size. Air passes thereinto and past a butterfly valve 38 operated by electromechanical means 40 through a control rod 42 and bell crop or the like. Valve 38 may be for example, of square configuration. When closed it can be at 30° relative to a line normal to its axis and maybe wide open at 90° relative to the same line. Means 40 may include an electromechanical servo actuator (not shown) and electronic speed control means (not shown) which comprise a closed loop servo in which actual cable speed is compared with commanded cable speed and valve 38 is automatically adjusted accordingly by rod 42.

An air diffuser 44 which may have, for example, a pair of splitter plates (not shown) is disposed in ducting 46 between valve 38 and an air-driven turbine 48. Ducting 46 makes a 90° bend from the diffuser 44 exist into the stator portion 50 of turbine 48. The bend portion may include turning vanes (not shown) to minimize bend losses. Rotor portion 52 of turbine 48 has blades 54 and is interconnected by a two stage speed reduction transmission 56 to a low speed rotatable cable spool 58. Transmission 56 can reduce rotational speed, for example, about 13:1 from rotor 52 to spool 58. A typical spool 58 which may be designed to reel in 2500 ft. of a steel cable 60 with 0-21 inch diameter at the rate of about 1000 fpm may have a spool size and configuration which results in a spool rotation speed of about 477 rpm. A typical turbine design speed of about 6194 rpm requires a 12.98 speed reduction by transmission 56 to accommodate these two components.

A pneumatically powered brake assembly 62, including disc and calipers (not shown) can be mechanically connected to the primary shaft 64 of speed reducer 56. Assembly 62 has the function of holding target 12 in the fully deployed position at the end of a desired length of cable 60 and of also being capable of serving cable 60 in an emergency. For example, if brake 62 is applied while cable 60 is being rewound, cable 60 will break and allow target 12 to be jettisoned.

System 10 may also include a levelwind device 66 which automatically provides reciprocating action, thus permitting cable 60 to be uniformly wound onto spool 58. Chains 68 and sprockets 70 on the drive mechanism of spool 58 and on the levelwind drive shaft 72 synchronize the speed of levelwind device 66 with that of spool 58 in order to properly translate cable 60 to spool 58.

Any suitable launching device can be used in system 10, such as launcher assembly 74 shown in FIG. 2. Assembly 74 includes arm 16 which is releasably locked to a plate 76 secured on target 12 by a locking arm 78 which may be pneumatically powered by a pressure bottle 80, for example, a 3000 psi nitrogen bottle connected to a pressure reducer (not shown) in housing 14. Bottle 80 also powers brake 62. An opening 82 is provided in the side of housing 14 through which arm 16 is caused to rotate between the operational vertical position of FIGS. 1 and 2 and the stored horizontal position of FIGS. 3 and 4. Thus, a penumatic ram 84 powered by bottle 80 can be connected to a curved lever arm 86, which is in turn can be secured directly to arm 16 or to a roller 88 at the top of arm 16 to effect desired rotation of arm 16 between the operative and stored positions previously described.

Assembly 74 also includes guide rollers such as those designated 92, 94, 96 and 98 around which cable 60 is trained and guided along a path from levelwinder 66 through arm 16 and into connection with target 12.

It will be further understood that the launcher assembly used in system 10 could, instead of assembly 74 comprise, if desired, other means than those of assembly 74 for locking and unlocking target 12 from housing 14 and means for forcing target 12, when unlocked, away from housing 14 rather than the target rotating means of assembly 74.

Target 12 is launched from housing 14 by first rotating target 12 into the down or operative position by pneumatic pressure provided by bottle 80 on command through solenoid operated valves (not shown) to ram 84 causing lever arm 86 to rotate arm 16. In the operative position, target 12 is exposed to the airstream below the aircraft and will then deploy being pulled away from the aircraft bearing housing 14, once it is unlocked from housing 14. Such unlocking is accomplished by operating solenoid controlled valves (not shown) to pneumatically open locking arm 78. Turbine 48 then acts as a dynamic brake during cable payout, turbine rotation being controlled by butterfly valve 38, in turn controlled by means 40, to a maximum speed of, for example, about 1000 ft/min. If overspeed or overacceleration is encountered at any time, during such payout, cable 60 is automatically activated to jettison target 12. When the cable length reaches about 2000 feet, the payout speed is ramped down gradually and when the cable finally stops, brake 62 is automatically activated and valve 38 is closed.

To initiate reeling in of target 12, brake 62 is released and valve 38 is opened until the actual cable reel-in speed equals the desired value. As target 12 nears housing 14, cable reeling velocity is reduced by gradually closing valve 38 slightly until locking arm 78 engages target 12, whereupon valve 38 is fully closed and brake 62 is applied. Target 12 can then be rotated up by arm 16 into the stored position out of the aircraft's slipstream and with adequate ground clearance.

Accordingly, system 10 is compact and efficient, can be used or small aircraft, is light in weight and low in cost and provides substantial advantages over conventional target deployment systems.

FIGS. 5 AND 6

A second preferred embodiment of the improved aerial gunnery target and towline reeling system of the present invention is schematically depicted in FIGS. 5 and 6. Thus, system 10a is shown. Components thereof similar to those of system 10 bear the same numerals but are succeeded by the letter "a". System 10a comprises a target 12a similar releasably connected to a housing 14a by a telescopable arm 16a. Housing 14a has a bracket 18a for connection to the underside of a wing or main body of an aircraft (not shown).

Arm 16a is shown in FIG. 5 in the fully retracted target stored vertical position. It will be understood that, in contract to system 10, system 10a is made with a sufficiently low profile and in a sufficiently small size such that target 12a in the vertical position shown in FIG. 5 will not provide a ground clearance problem for an aircraft and will not adversely affect the plane's operation.

When it is desired to deploy target 12a, arm 16a is telescoped down to the fully extended target launch position shown in FIG. 6, wherein target 12a is into the main aircraft slipstream and is well separated from housing 14a and the frame of the aircraft (not shown) to which housing 14a is attached by bracket 18a. Arm 16a is releasably locked to target plate 76a through a locking arm 78a which is operated by one of a plurality of electric motors 110 in housing 14a. Motors 110 are also responsible for telescoping arm 16a (with target 12a attached) between the target stored and target launch positions of FIGS. 5 and 6, in response to signals from suitable remote control means (not shown).

Another electric motor 112 operates spool 58a through drive means 114 and remote control means (not shown) to cause cable 60a to payout and reel in on spool 58a. An electric brake and cutter device (not shown) may also be connected to cable 60a. A levelwind device 66a may guide cable 60a to and from spool 58a and guide rollers such as roller 90a can be provided to guide cable 60a into arm 16a for connection to target 12a through plate 76a. Accordingly, system 10a has substantially the same target storing and launching capability as system 10. Both system 10 and system 10a can be fabricated of conventional durable components.

It will be understood that the target launch assembly of the present invention can be used in various forms and with various target reeling means other than those described for systems 10 and 10a. Various other modifications, changes, alterations and additions can be made in the improved system of the present invention, its components and parameters. All such changes, modifications, alterations and additions as are within the scope of the appended claims form part of the present invention.

What is claimed is:

1. An improved aerial gunnery target and tow reel system, said system comprising, in combination:
    (a) an aerial target;
    (b) a housing affixable to an airframe and disposed substantially parallel to and to one side of said target, said housing and target lying, in a target stored position, outside the slipstream of the airframe;
    (c) a cable spool secured for rotation in said housing, said cable spool having a towline cable wound therearound, said cable being connected to said target for towing said target;
    (d) reel motive and control means in said housing for reeling and unreeling said cable from said spool; and,
    (e) an improved target launcher assembly in said housing for launching said target away from said housing, said launcher assembly including:
        (1) a launcher arm extending horizontally from the side of the housing, releasably secured to said target and movable with said target between a target stored position and a target launch position, and
        (2) launcher arm motive means for rotating said arm and target about an axis longitudinally of said housing approximately 90 degrees downwardly between said target stored and a target launch position beneath the housing whereby only said target is outside the aircraft pressure field when rotated into said launch position.

2. The improved system of claim 1 wherein said launcher assembly includes remotely controlled means for locking said arm to and unlocking said arm from said target.

3. The improved system of claim 1 wherein said launcher arm motive means is pneumatic.

4. The improved system of claim 3 wherein pneumatic means operates said locking and unlocking means.

5. The improved system of claim 1 wherein said launcher arm motive means comprises an electric motor.

6. An improved aerial gunnery target system, comprising:
    (a) an aircraft having landing wheels;
    (b) a target;
    (c) a reel housing secured to said aircraft and disposed to the side of said target when said target is in a stored position;
    (d) a cable spool secured for rotation in said housing, said cable spool having a towline cable wound thereon, said cable being connected to said target for towing said target;
    (e) reel motive and control means in said housing for reeling and unreeling said cable from said spool;
    (f) a target deployment assembly in said housing for moving said target from a stored position to a launch position; including,
        (1) a launcher arm extending horizontally from the side of said housing releasably secured to said target and moveable between a stored target position and a target launch position,
        (2) launcher arm motive means for rotating said arm and target about an axis longitudinally of said housing approximately 90 degrees downwardly from said target stored position to said target launch position beneath said housing.

* * * * *